United States Patent [19]

Chalk et al.

[11] Patent Number: 4,619,778

[45] Date of Patent: Oct. 28, 1986

[54] HEAT STORAGE MATERIALS

[75] Inventors: Christine D. Chalk, Buckinghamshire; Cecil Hayman, Rickmansworth, both of United Kingdom

[73] Assignee: IC Gas International Limited, London, England

[21] Appl. No.: 746,020

[22] Filed: Jun. 19, 1985

Related U.S. Application Data

[63] Continuation of Ser. No. 623,294, Jun. 22, 1984, abandoned.

[51] Int. Cl.$^4$ .............................................. C09K 5/06
[52] U.S. Cl. ...................................................... 252/70
[58] Field of Search ......................................... 252/70

[56] References Cited

U.S. PATENT DOCUMENTS

| | | | |
|---|---|---|---|
| 2,989,856 | 6/1961 | Telkes | 652/371 |
| 4,273,667 | 6/1981 | Kent et al. | 252/70 |
| 4,426,307 | 1/1984 | Wada et al. | 252/70 |

FOREIGN PATENT DOCUMENTS

| | | |
|---|---|---|
| 56-147884 | 11/1981 | Japan . |
| 59-18785 | 1/1984 | Japan . |
| 59-53577 | 3/1984 | Japan . |

OTHER PUBLICATIONS

Elder, "Thermal Energy Storage Materials-A DSC Study," Thermochim. Acta, 36 (1980) 67-77.

Petitet et al., "Experimental Determination of the Volume Change of Salts and Salt Mixtures at Their Melting Point", Int. J. Thermophys. 1982, 3(2), 137-55, (CA 98:37650).

Yang et al., "Experimental Study on Using Sodium Sulfate Decahydrate Eutectic for Heat Storage", Taiyangneng Xuebao 1982, 3(2), 212-15, (CA 97:219583).

*Primary Examiner*—Robert A. Wax
*Attorney, Agent, or Firm*—Cushman, Darby & Cushman

[57] ABSTRACT

The material comprises at least one hydrated compound which undergoes reversible transformation to a less hydrated form and a fusion temperature-depressing salt, both dispersed and suspended throughout a water-swollen cross-linked polymer hydrogel (the hydrogel being as in European Pat. Nos. 99 and 11411). The improvement is that the fusion temperature-depressing salt is present in 50 to 75% of the eutectic amount; this substantially reduces thermal hysteresis.

In a modification of the invention, water is present in excess of the amount required to fully hydrate the compound, in which case the amount of fusion temperature-depressing salt may be 50 to 90% by weight of the eutectic amount.

9 Claims, 1 Drawing Figure

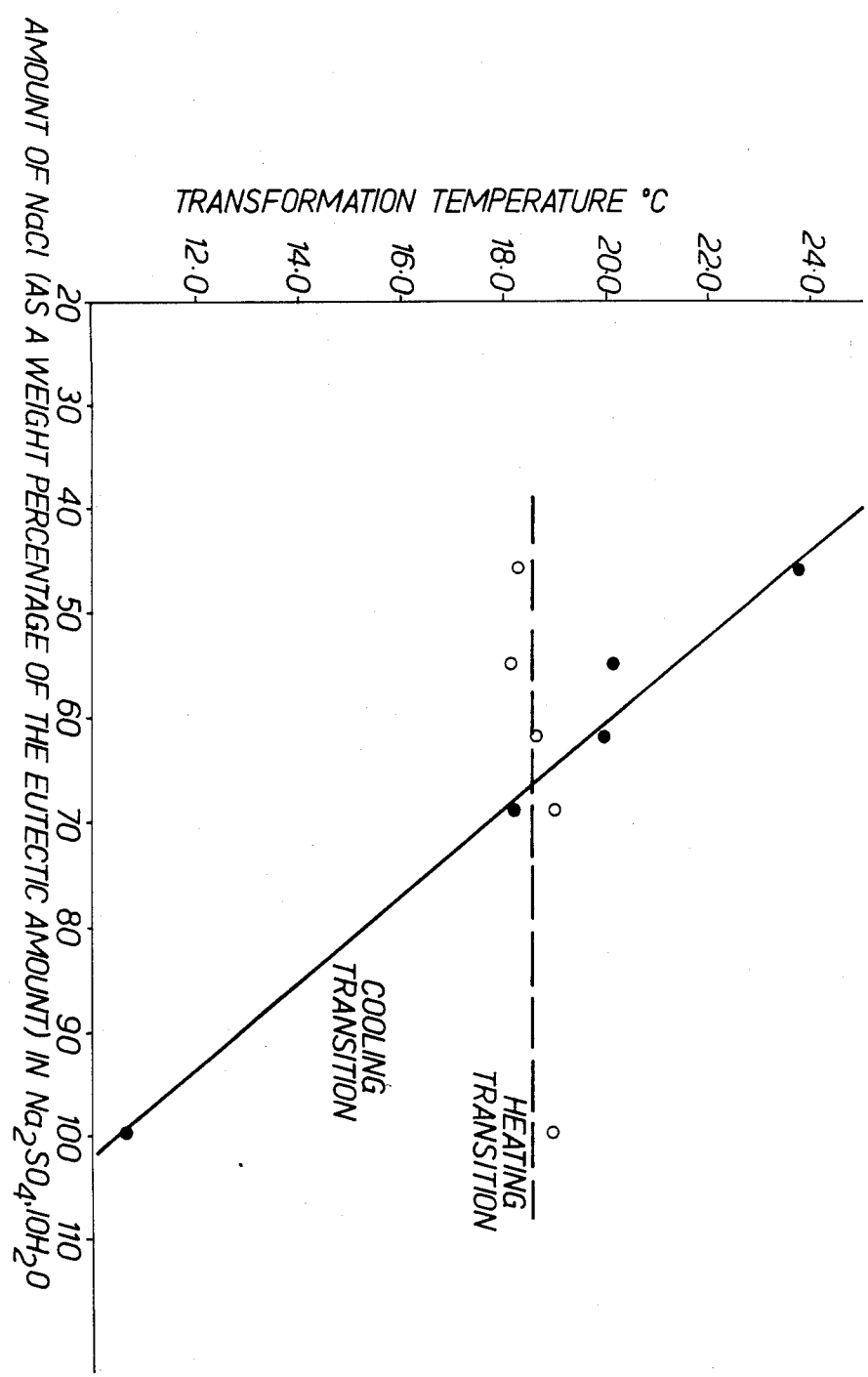

HEAT STORAGE MATERIALS

This is a continuation of application Ser. No. 623,294, filed June 22, 1984, which was abandoned upon the filing hereof.

The present invention is concerned with materials which can store thermal energy as latent heat.

A large number of hydrated compounds, such as inorganic salts, are known which absorb latent heat at a characteristic transition temperature on transition to the anhydrous or a less hydrated crystal form, and release the latent heat on reversion to the more hydrated form when cooling to a temperature below the transition temperature. The transition to the anhydrous or less hydrated form is sometimes called fusion, because solid hydrated compound transforms to liquid at the transition temperature.

Examples of hydrated compounds suitable for latent heat storage include the compounds listed in the following Table.

| Salt | Fusion temperature |
| --- | --- |
| Calcium chloride hexahydrate | 29° C. |
| Disodium hydrogen phosphate dodecahydrate | 35.5° C. |
| Sodium sulphate decahydrate | 32° C. |
| Sodium thiosulphate pentahydrate | 48° C. |
| Barium hydroxide octahydrate | 75° C. |
| Zinc nitrate hexahydrate | 35° C. |
| Potassium fluoride tetrahydrate | 18.5° C. |
| Sodium carbonate decahydrate | 35° C. |
| Lithium chlorate trihydrate | 8° C. |
| Sodium acetate trihydrate | 58° C. |

Further examples of suitable salts include sodium dihydrogen phosphate heptahydrate, magnesium chloride hexahydrate and double salts such as $K_2Mg(SO_4)_2.6H_2O$.

Of the above hydrated compounds, sodium sulphate decahydrate is particularly preferred because it is relatively inexpensive, is commercially available in large quantities and has a useful fusion temperature for the storage of solar energy, for example.

It is known to adjust the fusion temperature of the hydrated compound by the addition of a fusion temperature-depressing salt; examples of suitable fusion temperature-depressing salts for sodium sulphate decahydrate are disclosed in U.S. Pat. No. 3986969 and British Specification No. 2044437. Such fusion temperature-depressing salts, which are generally non-hydrated salts, are conventionally employed in amounts such that the resulting binary system is a eutectic mixture.

A problem with the use of hydrated compounds for heat storage is the incongruency of phase transition, that is, the transformation of the low-temperature solid phase to a two-phase condition in which solid and liquid coexist. In the two-phase condition, the difference in densities of the two phases causes segregation thereof, which limits their ability to recombine and form the low-temperature single solid phase. Consequently the amount of heat recoverable on cooling is reduced.

Various means of alleviating this problem have been proposed, two proposals being in our European Patents 99 and 11411, in both of which there is disclosed a heat storage material in which a hydrated compound of the type described above is dispersed throughout a hydrogel comprising a water-swollen cross-linked polymer. In European Pat. No. 99, the cross-linked polymer is formed by cross-linking a water-soluble polymer having pendant carboxylic or sulphonic acid groups by means of cations of polyvalent metal (that is, cross-linking is via an ionic mechanism), while in European Pat. No. 11411, the cross-linked polymer is formed by cross-linking a water-soluble or water-dispersible synthetic hydrophilic polymer by a covalent cross-linking mechanism.

While heat storage materials of the type described in the above European patents are generally satisfactory, we have found that when a eutectic mixture of a hydrated salt and a fusion temperature-depressing salt is employed, there is disadvantageously high hysteresis during thermal cycling. For example, with a heat storage material comprising a eutectic mixture of sodium sulphate decahydrate and sodium chloride, dispersed in a cross-linked polyacrylamide hydrogel, the material generally transforms to solid at 9° to 13° C. instead of at the theoretical value of 18° C., while on the heating cycle, fusion generally takes place at 19° to 21° C.

We have now surprisingly found that thermal hysteresis is substantially reduced if the amount of the fusion temperature-depressing salt is considerably less than that required to form a eutectic mixture with the hydrated compound.

According to the invention, therefore, there is provided a heat storage material which comprises at least one hydrated compound which undergoes reversible transformation to an anhydrous or less hydrated form, and at least one fusion temperature-depressing salt, dispersed and suspended throughout a water-swollen cross-linked synthetic polymer hydrogel, in which the fusion temperature-depressing salt is present in an amount of 50 to 75%, preferably 60 to 70%, by weight of the eutectic amount (that is, the amount required to form a eutectic mixture with the hydrated compound).

The amount of the fusion temperature-depressing salt required to form a eutectic mixture with the hydrated compound can be derived from solubility data, for example, as given in "Solubilities of Inorganic and Metal Organic Compounds", Volume 2, by William F. Linke (published by the American Chemical Society).

Thus, the amount of sodium chloride required to form a eutectic mixture with sodium sulphate decahydrate is about 16 grams per 100 grams of the mixture (one mole of sodium chloride per mole of sodium sulphate decahydrate); 50 to 75% by weight of this amount of sodium chloride is 8 to 12 grams.

The optimum amount of fusion temperature-depressing salt depends to some extent on the nature of the hydrogel, in particular on the nature and amount of the polymer and cross-linking agent therefor; the optimum amount for any particular system can be determined by routine experimentation.

The hydrogel itself may be formed by cross-linking a water-soluble or water-dispersible synthetic hydrophilic polymer. The latter polymer is preferably linear and thermoplastic, and may have:

(i) pendant carboxylic or sulphonic groups, in which case it is preferably cross-linked by reaction with cations of a polyvalent metal (in which case the polymer and the source of the cations of polyvalent metal are preferably as described in detail in the above-mentioned European Pat. No. 99); and/or (ii) functional groups which are cross-linkable by a covalent cross-linking mechanism (in which case the polymer and cross-linking agent therefor are preferably as described in detail in the above-mentioned European Pat. No. 11411).

It is particularly preferred that the cross-linked polymer retains active hydrophilic groups (that is, they are not blocked during cross-linking).

The polymer, the hydrated compound and the fusion temperature-depressing salt are preferably used in such amounts that the storage material contains a major proportion, by weight, of the hydrated compound and fusion temperature-depressing salt, and a minor proportion, by weight, of the cross-linked polymer, whereby the resulting material may have an advantageously high heat capacity per unit volume. For example, the proportion of polymer may be 0.1 to 10%, preferably 2 to 8% (for example, about 5%) based on the weight of the material according to the invention.

The hydrated compound may be conventional, for example, one or more of the compounds listed above; sodium sulphate decahydrate is particularly preferred.

Some hydrated compounds tend to undergo supercooling when cooled below the fusion point (that is, they do not transform back to the hydrated form until the temperature is below the theoretical fusion point). This may result in less hydrated forms of the compound being formed, with consequent reduction in the amount of energy released. In order to avoid supercooling, the material may be nucleated, for example, by a heat-transfer method as disclosed in U.S. Pat. No. 2677243, by careful control of the proportions of the ingredients of the composition, or by addition of an insoluble nucleating agent. Sometimes the polymer forming the hydrogel may act as the nucleating agent. A preferred nucleating agent for sodium sulphate decahydrate is borax, as proposed in U.S. Pat. No. 2677664. Other suitable nucleating agents are disclosed in British Specifications Nos. 1500245, 1543336 and 2001096, European Specifications 11357 and 13569, German Offenlegungsschrift No. 2550106, USSR Patent 568669 and Japanese Applications Nos. 55/120686 and 55/142076-81.

When a nucleating agent is present, this agent, like the hydrated compound and the fusion temperature-depressing salt, may be dispersed and suspended in the hydrogel and immobilized therein, or it may be added to preformed hydrogel.

The fusion temperature-depressing salt may be, for example, a halide (such as a chloride) or nitrate of sodium, potassium or ammonium, or a mixture of two or more thereof. The fusion temperature-depressing salt and the hydrated compound are preferably such that the fusion temperature of the heat storage material is in the range 0° to 25° C.; suitable fusion temperature-depressing salts for sodium sulphate decahydrate, and fusion temperatures which may be attained, are given below:

| Salt | Fusion temperature |
| --- | --- |
| Sodium chloride | 18° C. |
| Ammonium chloride | 10° C. |
| Potassium chloride | 4° C. |

The heat storage material according to the invention preferably contains water in an amount sufficient to hydrate all the anhydrous form of the compound. Water may be present in a small excess in some circumstances, reducing the heat storage capacity of the mixture but allowing the fusion temperature-depressing salt to be present in an amount greater than 75% by weight of the eutectic amount, for example, 75 to 90% by weight. (Of course less than 75%, that is 50 to 75%, can still be used according to the invention when water is present in excess.)

The heat storage material may, if desired, contain a dispersant which facilitates uniform and rapid solution of the polymer. Examples of such dispersants include certain organic liquids which are miscible in water. Particularly preferred such organic liquids are lower aliphatic alcohols, such as methanol or ethanol.

When such a water-miscible organic liquid is included (for example when the polymer is not highly water-soluble, but only sparingly water-soluble or water-dispersible), it is preferably present in a relatively minor amount, compared with water, for example from 5 to 25% based on the weight of water.

The material according to the invention is preferably used in a method of heat exchange which comprises alternately cooling the material to a temperature below the transition temperature of the hydrated compound, and passing a fluid at a temperature above the above-mentioned transition temperature in heat-exchange relationship with the material, so as to cool the fluid and heat the cold storage material above the transition temperature.

The alternate cooling and heating of the material can be repeated for many cycles. In use, the material is preferably retained in a receptacle of a gas- or vapour-barrier material.

In order that the present invention may be more fully understood, the following Examples and Comparative Example are given by way of illustration only.

COMPARATIVE EXAMPLE 1

Eight grams of anhydrous sodium sulphate and 32 grams of sodium chloride were dissolved in water and then 10 grams of polyacrylamide powder available commercially from Allied Colloids Ltd as WN33 was stirred into the solution at 25° to 30° C. until a clear gel solution was obtained. (WN 33 has an average molecular weight of about 4.5 million and a ratio of carboxyl:amide radicals of 7:3.)

A further 72 grams of anhydrous sodium sulphate was added with stirring to form a homogeneous mixture; 5 cm$^3$ of formalin (an aqueous solution containing approximately 40% by weight of formaldehyde and 14% by weight of methanol) was added with stirring and the resulting mix was maintained at 40° C. for six days. A few crystals of borax were added (as nucleating agent).

The resulting composition (which contained sodium chloride and sodium sulphate in equimolar proportions, this being the eutectic proportion) was subjected to a thermal cycling test by alternately heating to 35° C. and cooling to 5° C.; on the cooling part of the cycle, the average transformation temperature was 10.6° C., while on the heating part of the cycle, the average transformation temperature was 19° C.

EXAMPLE 1

Comparative Example 1 was repeated several times, except that the amount of sodium chloride was only 20 grams instead of 32 grams. (This corresponds to 62.5% by weight of the eutectic amount.)

In the cooling part of the thermal cycle test, the average transformation temperature was 20° C., while on the heating part of the cycle, the average transformation temperature was about 18.5° C.

EXAMPLE 2

The procedure of Comparative Example 1 was repeated several times, with sodium chloride in an amount of 17.6 grams (that is, 55% by weight of the eutectic amount).

In the cooling part of the thermal cycle test, the average transformation temperature was about 20.1° C., while on the heating part of the cycle, the average transformation temperature was about 18.1° C.

EXAMPLE 3

The procedure of Comparative Example 1 was repeated several times, with sodium chloride in an amount of 22 grams (that is, 69% by weight of the eutectic amount).

In the cooling part of the thermal cycle test, the average transformation temperature was about 18.3° C., while on the heating part of the cycle, the average transformation temperature was about 19.0° C.

COMPARATIVE EXAMPLE 2

The procedure of Comparative Example 1 was repeated several times, with sodium chloride in amount of 14.7 grams (46% by weight of the eutectic amount).

In the cooling part of the thermal cycle test, the average transformation temperature was about 23.8° C., while on the heating part of the cycle, the average transformation temperature was about 18.3° C.

The results obtained in the above Examples and Comparative Examples are summarised in the sole FIGURE of the accompanying drawing.

Similar effects to those illustrated in the above Examples can be obtained using other fusion temperature-depressing salts (such as potassium chloride, ammonium chloride or potassium nitrate) and/or other hydrated compounds.

We claim:

1. A heat storage material which comprises at least one hydrated compound which undergoes reversible transformation to an anhydrous or less hydrated form, and at least one fusion temperature-depressing salt, said compound and said salt being dispersed and suspended throughout a water-swollen cross-linked synthetic polymer hydrogel, in which the total amount of salt is 50 to 75% by weight of the eutectic amount.

2. A material according to claim 1, in which the amount or said salt is 60 to 70% by weight of the eutectic amount.

3. A material according to claim 1 or 2, in which said hydrogel is formed by covalently cross-linking a water-soluble or water-dispersible synthetic hydrophilic polymer.

4. A material according to any of claims 1 to 3, in which said cross-linked polymer has hydrophilic groups which have not been blocked during cross-linking.

5. A material according to any of claims 1 to 4, in which said salt is a halide or nitrate of sodium, potassium or ammonium, or a mixture of two or more thereof.

6. A material according to claim 5, in which said salt is a chloride.

7. A material according to any of claims 1 to 6, in which said hydrated compound and said salt are such that the heat storage material has a fusion temperature in the range 0° to 25° C.

8. A material according to any of claims 1 to 7, in which said hydrated compound is sodium sulphate decahydrate.

9. A modification of the heat storage material claimed in any of claims 1 to 8, in which water is present in excess of the amount needed to fully hydrate the anhydrous form of said compound and the amount of said salt is 75 to 90% by weight of the eutectic amount.

* * * * *